Patented Aug. 14, 1934

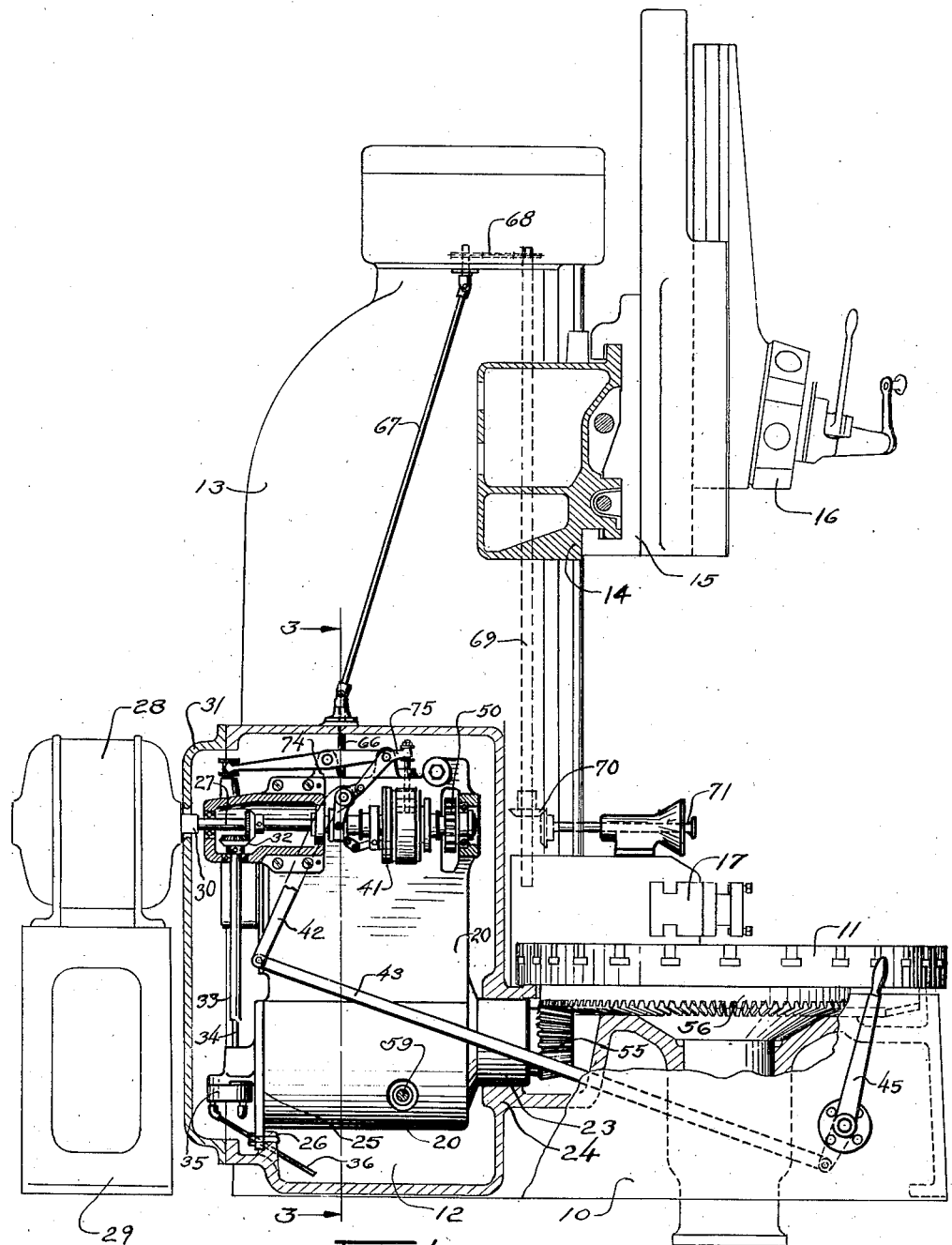

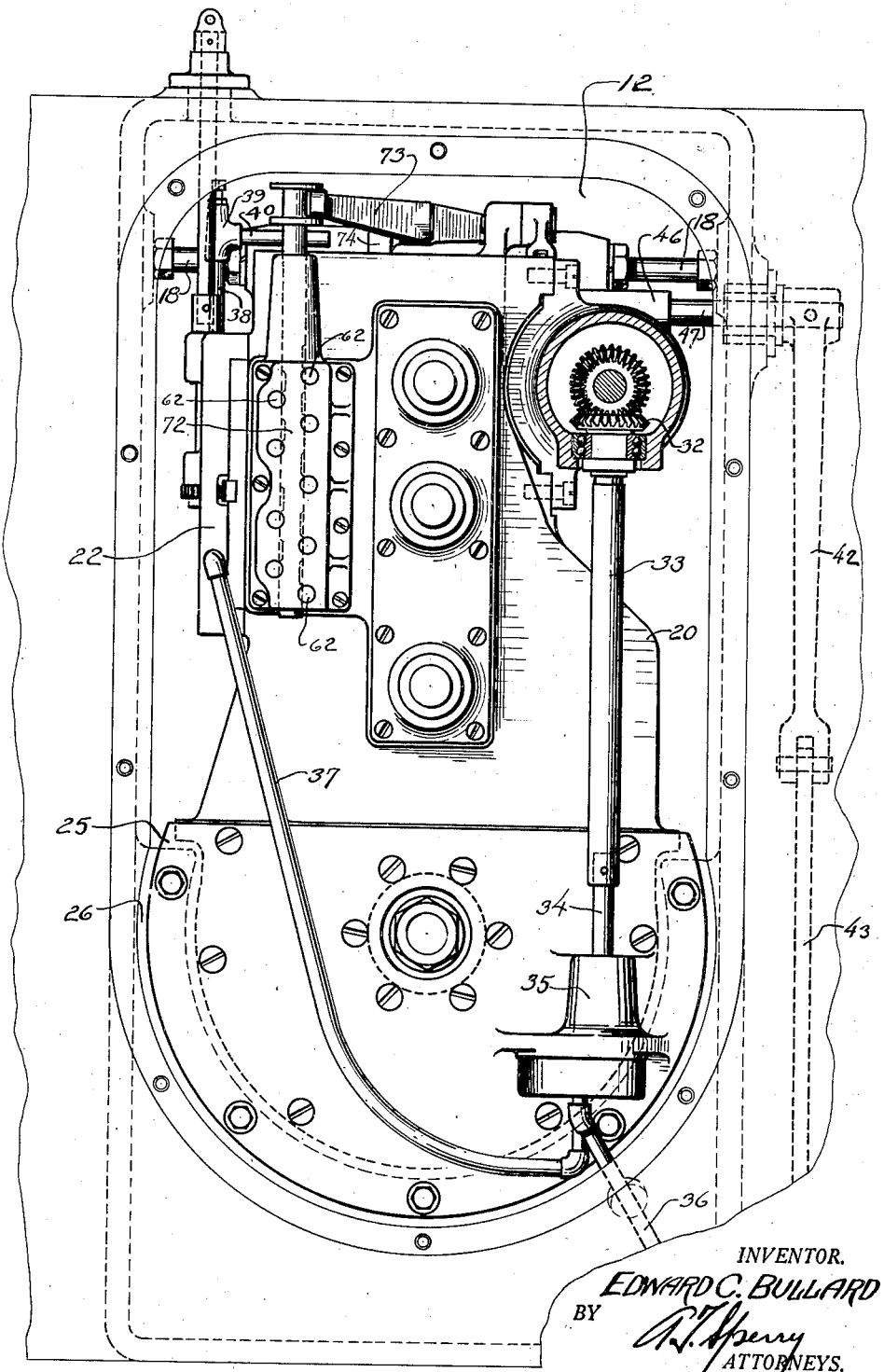

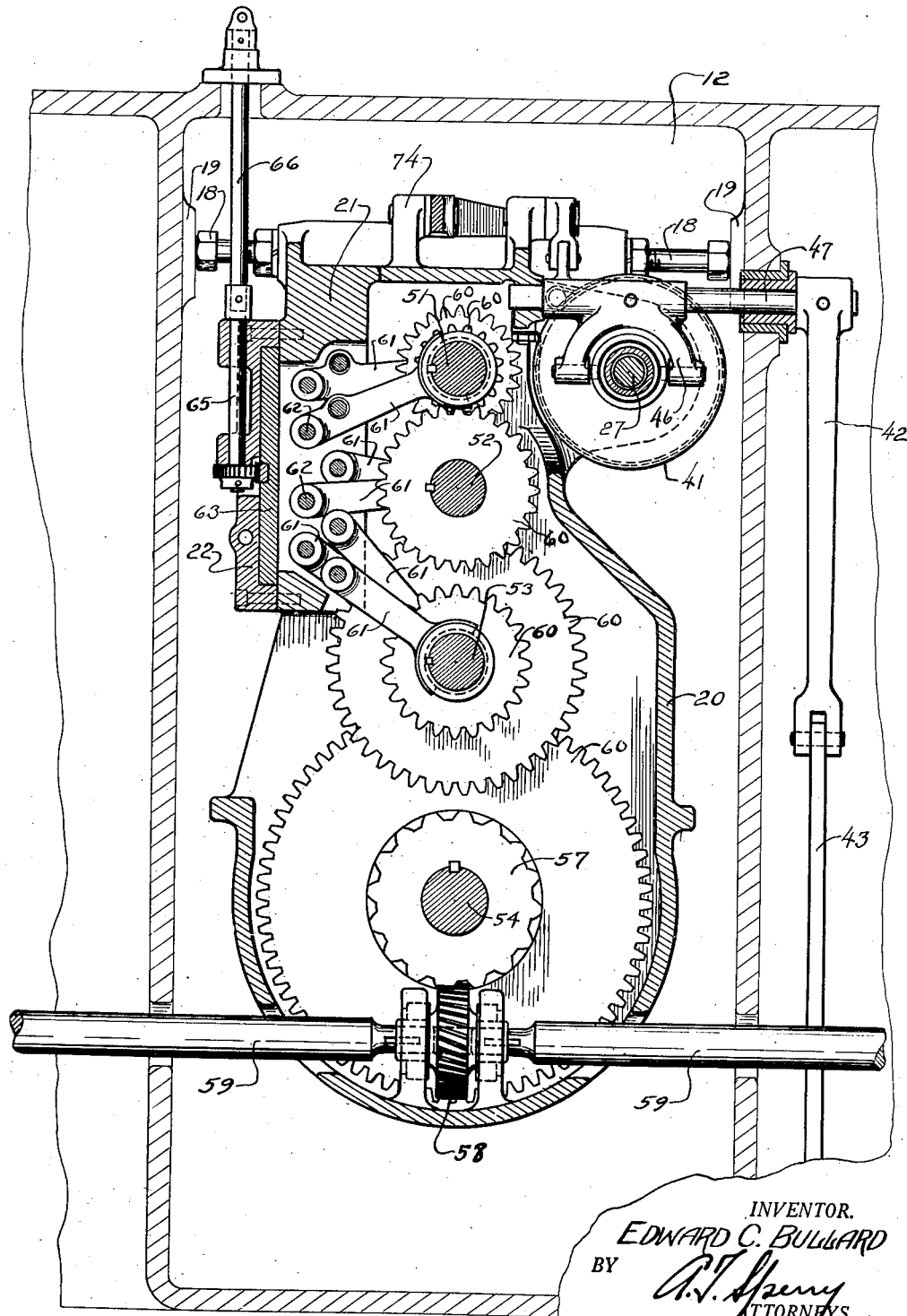

1,970,277

UNITED STATES PATENT OFFICE 1,970,277

HEADSTOCK UNIT

Edward C. Bullard, Southport, Conn., assignor to The Bullard Company, a corporation of Connecticut Application November 4, 1932, Serial No. 641,185

11 Claims. (Cl. 29—29)

This invention relates to headstock units such as are applicable to machine tools and more particularly to machine tools of the lathe or milling machine type.

It is among the prime objects of the invention to provide a self-contained unit headstock of compact design which in a single assembly includes in combination with variable speed gearing, instrumentalities which are frequently connected with the gearing through the addition to the machine of separate units.

Another fundamental object of the invention is to provide a headstock unit which is independently removable from the machine base so that it may be organized independently of the other structure of the machine and may be applied thereto and may be readily removed therefrom for substitution, repairs, adjustments or the like.

Another object is to provide a unit headstock assembly which combines in a single instrumentality, shafts and gears, gear actuating mechanism and a clutch and brake, the arrangement being such that the inclusive structure facilitates both the manufacture and the servicing of machine tools.

A further object is to provide a headstock assembly incorporating in a unit mechanism, gears and gear shifting mechanism, thus to minimize the number of independent units which combine to form a complete machine.

Another object is to provide a headstock incorporating a power gear shifting mechanism and a pump operable with the headstock gears for supplying pressure for the operation of the gear shifting mechanism, a further feature of the invention being the utilization of such pump for supplying both oil for lubrication as well as for gear actuation.

A further and more specific object is to provide a machine tool headstock which may be inserted and removed from the base of the machine and which includes in a unit assembly a power driven shaft, change speed gearing, a clutch and brake, gear shifting mechanism, an oil pump and a source of power for the gear shifting mechanism.

Numerous other objects of invention will be apparent from a consideration of the following specification and the drawings.

In connection with the specific structural details herein disclosed by way of illustrating one specific embodiment of the present invention, it will be readily understood that the inventive concept is susceptible to a wide variety of mechanical embodiments and that the invention is in no way limited to the structural details herein illustrated and described. Numerous changes, modifications and the full use of equivalents are obviously within the scope of the invention.

In that form of the invention shown, a headstock including shafts and shiftable gearing therebetween is illustrated as being mounted in a unitary frame which is bodily removable from the base of the machine, the final drive shaft being arranged to directly drive a work table while the initial shaft is adapted for a direct connection with the driving shaft of a suitable source of power. Mounted with the initial shaft there is preferably provided a main clutch and brake and a pump driving shaft, the pump being formed with the frame. The unit construction also preferably includes suitable gear shifting mechanism which is here illustrated as automatically selectable hydraulic means for choosing the gear combinations between the shafts. As illustrated, the unit assembly may include control rods and links and interlocking mechanism, the arrangement being such that the complete headstock including shafts, gears, gear shifters, clutch brake, and pump are in a single assembly which may be readily inserted and removed from a machine tool base without disturbing other instrumentalities of the complete machine.

In the drawings

Fig. 1 is a side elevation partly in section, illustrating the application of the invention to one type of machine tool;

Fig. 2 is a rear elevation of the unit as it would appear with the cover removed from the base of the machine illustrated in Fig. 1, and Fig. 3 is a sectional view taken on line 3—3 of Fig. 1.

While the present invention is obviously applicable to various types of metal working machines, it will be understood to be particularly applicable to drilling, milling or lathe machines and by way of illustration is here shown as mounted in a boring mill of the vertical turret lathe type. The complete machine is illustrated in Fig. 1 and includes a base 10 which supports and journals a work table 11. The base forms a compartment 12 which receives the headstock unit. From the base extends upwardly a column 13 which supports a vertically adjustable cross rail 14 upon which is mounted a transversely slidable saddle 15 which usually carries the tool turret 16. Adjacent the table a cross slide 17 may be mounted, it being understood that the structure and arrangement of these parts vary in accordance with the type of the machine and form no part of the present invention. Obviously, the unit is applicable, not only to wide variations in the type of lathe to which it is applied, but is also adapted for use in connection with numerous other radically different machine tools.

The unit headstock assembly which constitutes the present invention includes a frame or housing 20, the lower portion of which is curved to conform with the gears mounted therein. The frame extends upwardly from the rounded portion to provide end walls for journalling the ends of the gear shafts. One side wall is thickened at 21 to provide cylinders and piston rod bearing means for the gear actuating mechanism and to provide a valve casing 22 therefor. The forward lower end of the frame includes a cylindrical nose 23 which is adapted to be fitted in a conforming aperture in the supporting portion 24 of the front wall of the base compartment. The opposite end of the frame is provided with a flange 25 which is adapted to be bolted to a cooperating flange 26 of the base compartment, thus the frame is removably supported within the base, the front end being supported by the fitting of the nose within the base aperture, while the lower rear wall is supported by bolts between the flanges 25 and 26. As shown more clearly in Figs. 2 and 3, the upper end of the frame is supported against vibration or movement about the axis of the final driven shaft by adjustable bracing bolts 18 which extend outwardly from the sides of the frame at the top portion thereof, their heads being adapted to be adjusted to firmly abut thickened bracing portions 19 of the compartment.

Power may be supplied to the main shaft 27 of the headstock through a suitable source of power here illustrated as the motor 28 mounted on a suitable support 29. Numeral 30 indicates a removable connection for uncoupling the motor so that the compartment cover 31 may be removed and to permit removal or adjustment of the unit.

The shaft 27, when the motor is operating, is adapted to constantly drive, through gear connection such as the bevel pinions 32, a pump shaft 33 which is designed to rotate the pump rod 34 and thereby actuate any suitable or conventional pump mechanism such as may be enclosed within the pump housing 35. The pump is designed to draw oil through the tube 36 from the naturally formed oil sump in the bottom of the compartment. Such oil is forced by the pump through a supply tube 37 leading to the fluid pressure actuated gear controlling mechanism hereinafter described. From this mechanism the oil leaves by an outlet tube 38 past a pressure relief valve 39 and discharges through a suitable lubricating nozzle 30. By this arrangement it will be seen that so long as the shaft is operated the pump likewise may be operated and oil under pressure will be constantly supplied and will act to perform the dual function of supplying fluid under pressure for the gear shifters as well as supplying oil for the lubrication of the unit, the pressure relief valve 39 acting to maintain a predetermined pressure of lubrication.

The inner end of the shaft 27 is provided with a combined clutch and brake generally indicated by the numeral 41. This combined unit is adapted to be actuated by means of a control lever 42 which by a link 43 is removably connected with a hand lever 45 which may be mounted at the control station of the machine. The clutch and brake arrangement includes a forked clutch and brake actuator 46 which by oscillation of the rod 47 connected with the lever 42 is designed to first disengage the clutch and then apply the brake and vice versa through stepped movements of the operating lever. Thus, it will be seen that when it is desired to disconnect the drive to the table, the lever may be moved first to disengage the clutch and second to break any momentum which may act to continue the rotation of the gears of the headstock after disengagement of the clutch.

Associated with the clutch 41 is a gear 50 which is designed to be rotated by and with the shaft 27 when the clutch is engaged. The gear 50 is adapted through conventional gear connection to drive the primary shaft 51 of the speed change assembly of the unit. That form of the assembly which is here illustrated, merely for the convenience to clarity, is more completely illustrated and described in the co-pending application of Frank H. Mussler, filed February 8, 1933 Ser. No. 655,735 reference to which application may be had for consideration of the details of one type of speed change mechanism which may be used. In the form illustrated, the speed change assembly includes shafts 52, 53 and 54, all of which are in vertical alignment with the shaft 51 and thus parallel thereto. The intermediate shafts 52 and 53 as well as the primary shaft 51 carry slidable gears which are designed to produce a wide speed ratio between the shaft 27 and the final drive shaft 54 which latter extends outwardly through the cylindrical portion of the frame and carries the bevel gear 55 which meshes with the bevel gear 56 of the table 11. The shaft 54 is also preferably provided with a worm pinion 57 meshing with a companion pinion 58 which drives removable shafts 59 which extend at right angles from the unit outwardly on both sides for the purpose of driving tool mechanism or the like at a speed having different ratio with the speed of the table. In connection with these tool driving shafts it will be understood they may be disconnected from drive by the gear 58 and be removed from the frame so as not to impede movement of the frame from the compartment in a direction at right angles to the direction of the shafts.

For shifting the gears of the speed change mechanism which gears are herein indicated by the numerals 60, shifting arms or forks 61 are preferably utilized and in the mechanism illustrated, there is indicated a fluid pressure shifting mechanism formed in accordance with that illustrated in the application before mentioned. This mechanism includes arm shifting rods 62 which are attached to the forks and which by endwise movement actuate the forks to control the position of the gears so that their relation may be changed to vary the gear combination. The rods may be operated through pistons selectively driven by fluid pressure which may be selectively admitted thereto by an apertured valve plate 63, lengthwise movement of which is provided for through a gear connection with a shaft 65, which shaft is removably connected with a companion shaft 66 extending through the compartment, the upper end being joined by shafts 67 coupled by gears 68 with the valve shaft 69 which by bevel gear 70 may be rotated from the work position of the machine by the knob and dial generally indicated at 71. Thus the operator may by rotation of the knob rotate the shaft 65 thus moving the valve plate 63 so as to bring about the required registration so as to shift the desired gear to bring about whatever gear combination is desired.

The pistons and fluid pressure system are more fully described in the co-pending application which also describes in detail an interlocking means for preventing the manual manipulation of the clutch and brake at an undesired time. Such means include a notched shaft 72, the notches of which are adapted when the shaft is in desired position to register with notches in the rods 62 so as to be freely movable. The upper end of shaft 72 is attached to a pivoted lever 73 mounted in the bracket 74 forming part of the frame, its opposite end being connected through lever 75 to the clutch fork operating lever 42. Thus the whole unit provides in combination with the gear adjusting mechanism and clutch control mechanism, a unitary self-contained interlock for restraining undesired actuation of the members.

From the foregoing description, it is believed that the operation of the unit will be clearly understood and in the interest of brevity, step by step description thereof is omitted. It is further believed that the description clearly sets forth the essence of the invention which resides in the provision of a unitary self-contained and inclusive headstock assembly which may be removable as a unit. It will be noted that the exemplification of the inventive concept provides change gearing, automatic operating means therefor, a clutch and brake, and means for lubricating and supplying pressure for the operating means. Obviously, numerous changes and modifications and the full use of equivalents may be used without departing from the spirit or scope of the invention.

Having thus set forth the nature of my invention, what I claim is:

1. In a machine tool, a removable headstock unit including a frame, a driving shaft mounted in the frame, a driven shaft mounted in said frame, changeable gearing between said shafts and a fluid pressure pump mounted in said frame and operable by said driving shaft operable to control said gearing.

2. In a machine tool, a headstock unit for driving the same including a frame, a driving shaft mounted in the frame, a clutch and brake associated with said driving shaft, a driven shaft mounted in said frame, changeable gearing between said shafts and a fluid pressure pump mounted in said frame and operable by said driving shaft operable to control said gearing independently of said clutch.

3. In a machine tool, a headstock unit for driving the same including a frame, a driving shaft mounted in the frame, a driven shaft mounted in said frame, changeable gearing between said shafts, and fluid pressure supply means mounted in said frame and arranged to deliver pressure for the operation of said change speed mechanism.

4. In a machine tool, a headstock unit for driving the same including a frame, a driving shaft mounted in the frame, a clutch and brake associated with said driving shaft, a driven shaft mounted in said frame, changeable gearing between said shafts, and fluid pressure supply means mounted in said frame operable by said driving shaft independently of said clutch.

5. In a machine tool, a headstock unit for driving the same including a frame, a driving shaft mounted in the frame, a clutch and brake associated with said driving shaft, a driven shaft mounted in said frame, changeable gearing between said shafts, and fluid pressure supply means mounted in said frame arranged to deliver pressure for the operation of said change speed mechanism and operable by said driving shaft independently of said clutch.

6. In a machine tool, a headstock including a frame, a driving and a driven shaft mounted in said frame, changeable gearing between said shafts, fluid pressure actuated means for controlling said gears, a lubrication pump mounted in said frame and means for delivering fluid under pressure from said lubricating pump to said means.

7. In a machine tool having a work table, the combination therewith of a removable unit headstock including a removable frame, a driving shaft mounted therein and extending therefrom for connection with a motor, a clutch and brake associated with said shaft, a driven shaft mounted in said frame and extending therefrom for directly driving the work table, changeable gearing between said shafts, fluid pressure means for selectively changing said gears and a fluid pressure pump mounted in said frame and driven from said driving shaft independently of said clutch and brake.

8. In a removable headstock for machine tools, the combination in a single unit of a frame adapted to be removably mounted within the base of the machine, shafts mounted in said frame, changeable gearing interconnecting said shafts, fluid pressure means for controlling said gearing, and means on said frame for supplying fluid under pressure to said first mentioned means.

9. In a headstock for machine tools, the combination of a frame, shafts mounted in said frame, changeable gearing interconnecting said shafts and fluid pressure means for controlling said gearing, said means being mounted wholly within said frame and a controller for said fluid pressure means mounted on said frame and extending therefrom for connection with an independently mounted control member.

10. In a machine tool headstock unit, a frame adapted to be mounted within a compartment of a machine base, a flange on one portion of said frame adapted for bolting with a cooperating flange of the base and a projection on said frame adapted to be fitted in and supported by the walls of an aperture of said compartment.

11. In a machine tool headstock unit, a frame adapted to be mounted within a compartment of a machine base, a flange on one portion of said frame adapted for bolting with a cooperating flange of the base and a projection on said frame adapted to be fitted in and supported by the walls of an aperture of said compartment, said flange and projection being at opposite sides of said frame whereby they cooperate to fully support said frame.

EDWARD C. BULLARD.